United States Patent
Hisano et al.

(10) Patent No.: US 10,110,310 B2
(45) Date of Patent: Oct. 23, 2018

(54) TRANSMISSION SYSTEM AND TRANSMISSION METHOD

(71) Applicant: NIPPON TELEGRAPH AND TELEPHONE CORPORATION, Tokyo (JP)

(72) Inventors: Daisuke Hisano, Yokosuka (JP); Jun Terada, Yokosuka (JP); Naotaka Shibata, Yokosuka (JP); Shigeru Kuwano, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/580,799

(22) PCT Filed: Jun. 16, 2016

(86) PCT No.: PCT/JP2016/067933
§ 371 (c)(1),
(2) Date: Dec. 8, 2017

(87) PCT Pub. No.: WO2016/204226
PCT Pub. Date: Dec. 22, 2016

(65) Prior Publication Data
US 2018/0234188 A1 Aug. 16, 2018

(30) Foreign Application Priority Data

Jun. 19, 2015 (JP) .................................. 2015-123730

(51) Int. Cl.
*H04J 14/08* (2006.01)
*H04B 10/29* (2013.01)
(Continued)

(52) U.S. Cl.
CPC .......... *H04B 10/29* (2013.01); *H04B 10/2575* (2013.01); *H04B 10/27* (2013.01);
(Continued)

(58) Field of Classification Search
CPC . H04W 16/14; H04W 72/0446; H04W 88/06; H04J 3/1694; H04J 3/00;
(Continued)

(56) References Cited

U.S. PATENT DOCUMENTS 6,778,557 B1 * 8/2004 Yuki ................... H04L 12/1877
370/230
2008/0145057 A1 6/2008 Lee et al.
(Continued)

FOREIGN PATENT DOCUMENTS

| JP | 2015-076761 A | 4/2015 |
| WO | WO-2014/061552 A1 | 4/2014 |
| WO | WO-2014/077168 A1 | 5/2014 |

OTHER PUBLICATIONS

"NTT Technical Journal, Technology Basic Course [GE-PON Technology], Part 1:PON", [online], 2005, Nippon Telegraph and Telephone Corporation, [accessed May 21, 2015], Internet <URL http://www.ntt.co.jp/journal/0508/files/jn200508071.pdf> with partial translation.

(Continued)

*Primary Examiner* — Don N Vo
(74) *Attorney, Agent, or Firm* — Harness, Dickey & Pierce, P.L.C.

(57) ABSTRACT

A transmission system for relaying communication of communication systems includes a relay unit configured to relay uplink communication and downlink communication of a communication system that performs a time division duplex (TDD) mode through signals of different wavelengths, an information acquisition unit configured to acquire time division information indicating timings of the uplink communication and the downlink communication in the communication system that performs the TDD mode, a calculation unit configured to calculate a free period unused in relaying of communication of the communication system (Continued)

that performs the TDD mode on the basis of the time division information for each wavelength, and an instruction unit configured to instruct the relay unit to relay communication of another communication system different from the communication system that performs the TDD mode in the free period for each wavelength calculated by the calculation unit.

4 Claims, 11 Drawing Sheets

(51) Int. Cl.
      H04J 14/02      (2006.01)
      H04B 10/27      (2013.01)
      H04L 5/14       (2006.01)
      H04B 10/2575    (2013.01)
(52) U.S. Cl.
      CPC .............. *H04J 14/02* (2013.01); *H04J 14/08* (2013.01); *H04L 5/14* (2013.01)
(58) Field of Classification Search
      CPC .......... H04J 3/0682; H04J 14/08; H04J 14/02; H04J 5/14; H04B 10/29; H04B 10/2575; H04B 10/27
      USPC .......................................................... 398/79
      See application file for complete search history.

(56) References Cited

U.S. PATENT DOCUMENTS

| 2015/0171955 A1* | 6/2015 | Olesen ................... H04B 7/265 370/252 |
| 2015/0229397 A1 | 8/2015 | Shibata et al. |
| 2015/0311980 A1 | 10/2015 | Kuwano et al. |

OTHER PUBLICATIONS

3GPP, "Evolved Universal Terrestrial Radio Access (E-UTRA) and Evolved Universal Terrestrial Radio Access Network (E-UTRAN); Overall description; Stage 2 (Release 12)", 3GPP TS 36.300(V12.4.0), 2014.
"NTT Technical Journal, Technology Basic Course [GE-PON Technology], Part 3: DBA Function", [online], 2005, Nippon Telegraph and Telephone Corporation, Internet <URL http://www.ntt.co.jp/journal/0510/files/jn200510067.html> with partial translation.
Naoto Yoshimoto, Operator Perspective on Next-Generation Optical Access for High-Speed Mobile Backhaul, Optical Fiber Communication Conference and Exposition and the National Fiber Optic Engineers Conference (OFC/NFOEC), 2013, Mar. 2013, 0Tu2E.1.
Takayoshi Tashiro, et al., A Novel DBA Scheme for TDM-PON based Mobile Fronthaul, Optical Fiber Communications Conference and Exhibition (OFC), 2014, Mar. 2014, Tu3F.3.
International Search Report for PCT/JP2015/067933, ISA/JP, dated Aug. 16, 2016 with attached translation.
Masahiro Sarashina, et al., "A study on dynamic boundary bandwidth in the OLT which accommodates both wired and wireless services", Proceedings of the 2015 IEICE General Conference Communication 2, the Institute of Electronics, Information and Communication Engineers, Mar. 2015, p. 255, B-8-11, with partial translation thereof.
Daisuke Kuno, et al., "A study of Accommodation of Mobile and Other systems in a PON system Using mobile TDD Frame Estimation", Proceedings of the 2015 Society Conference of IEICE, the Institute of Electronics, Information and Communication Engineers, Sep. 2015, p. 120, B-8-10, with partial translation thereof.
Notice of Allowance for parallel application JP 2017-525293, JPO, Tokyo, dated May 8, 2018, with English translation attached.

* cited by examiner

FIG. 9

| CYCLE | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 5 ms | D | S | U | U | U | D | S | U | U | D |
| 5 ms | D | S | U | U | D | D | S | U | U | D |
| 5 ms | D | S | U | D | D | D | S | U | D | D |
| 10 ms | D | S | U | U | U | D | D | D | D | D |
| 10 ms | D | S | U | U | D | D | D | D | D | D |
| 10 ms | D | S | U | D | D | D | D | D | D | D |
| 5 ms | D | S | U | U | U | D | S | U | U | D |

D: DOWNLINK SUBFRAME
U: UPLINK SUBFRAME
S: SPECIAL SUBFRAME

TRANSMISSION SYSTEM AND TRANSMISSION METHOD

CROSS-REFERENCE TO RELATED APPLICATIONS

This application is a 371 U.S. National Stage of International Application No. PCT/JP2016/067933, filed Jun. 16, 2016, which claims the benefit of and priority to Japanese Patent Application No. 2015-123730, filed Jun. 19, 2015. The entire disclosures of both of the above applications are incorporated herein by reference.

TECHNICAL FIELD

The present invention relates to a transmission system and a transmission method.

BACKGROUND ART

A wireless base station and a host device, which aggregates wireless base stations, are connected via an optical section (also referred to as an "optical transmission section") including an optical device and an optical fiber. This optical section is referred to as mobile backhaul. Also, systems for separating an antenna unit (a remote radio head (RRH)) of a wireless base station and a signal processing unit (a baseband unit (BBU)) have recently been widely considered. The RRH and the BBU are connected via an optical device and an optical fiber, and an optical section thereof is referred to as mobile fronthaul.

FIG. 8 is a diagram illustrating a configuration example of mobile fronthaul and mobile backhaul. FIG. 8 illustrates a wireless communication system in which a large number of small cells with low transmission power are overlaid in the coverage of a macro cell with high transmission power as an example. An optical wavelength division multiplexing (WDM) mode is used for the mobile backhaul between a wireless base station and a host device and the mobile fronthaul between an RRH and a BBU. In the WDM mode, different wavelengths are used for uplink and downlink. It is possible to transmit and receive an uplink signal and a downlink signal at the same time by a single core optical fiber using the WDM mode (for example, see Non-Patent Literature 1). Also, the uplink is a link in a direction from a terminal (a mobile wireless terminal in the case of the wireless communication system) to a network (a mobile network (NW) in the case of the wireless communication system) and the downlink is a link in a direction from the network to the terminal.

On the other hand, in wireless communication system, two modes of a frequency division duplex (FDD) mode and a time division duplex (TDD) mode are widely used. In the FDD mode, different frequency bands are used for uplink and downlink. In the TDD mode, the uplink and the downlink share the same frequency band and signals are orthogonal on a time axis.

FIG. 9 is a diagram illustrating a TDD frame of Long Term Evolution (LTE). As illustrated in FIG. 9, for example, seven types of TDD frames are set in LTE, and each TDD frame includes nine subframes. In the TDD mode, a frame configuration is switched in accordance with uplink and downlink traffic. Through this switching, a ratio of communication times of the uplink and the downlink can be flexibly set. A special subframe (S) illustrated in FIG. 9 includes downlink pilot time slot (DwPTS), a guard period (GP), and an uplink pilot time slot (UpPTS) (for example, see Non-Patent Literature 2). DwPTS is a time slot used for transmission of a downlink control signal. UpPTS is a time slot used for transmission of an uplink control signal. GP is a protection time used for conversion from downlink into uplink.

FIG. 10 is a diagram illustrating an example of bandwidth utilization in a wireless section and an optical section when a wireless communication system uses the TDD mode. In a wireless section in which a wireless base station or an RRH of the wireless communication system communicates with a mobile wireless terminal, data is transmitted so that uplink and downlink are orthogonal on a time axis with the same frequency f1. Thus, even when data to be transmitted and received in the wireless section is relayed in the optical section through downlink of a wavelength $\lambda 1$ and uplink of a wavelength $\lambda 2$, the uplink and the downlink are transmitted to be orthogonal on a time axis. Accordingly, there is a section in which data transmission is hardly performed at the wavelengths of the uplink and the downlink even though the WDM mode in which the uplink and the downlink can communicate simultaneously is adopted in the optical section.

Also, it is conceivable that a passive optical network (PON) system, which is one of optical transmission systems, accommodates a communication system such as a wireless communication system.

FIG. 11 is a diagram illustrating an example of a communication system using a PON system in an optical section. Conventionally, the PON system generally accommodates a service such as a fiber to the home (FTTH) service. Recently, accommodation of a machine to machine (M2M) service in which devices communicate with each other and operate without human intervention has also been considered. However, as illustrated in FIG. 11, it is conceivable that a PON system accommodating the FTTH service and the M2M service and a PON system accommodating the wireless communication system are physically separate networks.

DOCUMENT OF PRIOR ART

Non Patent Literature

[Non-Patent Literature 1]
"NTT Technical Journal, Technology Basic Course [GE-PON Technology], Part 1: PON", [online], 2005, Nippon Telegraph and Telephone Corporation, [accessed May 21, 2015]. Internet <URL http://ww.ntt.co.jp(journal/0508/files/jn20050B071.pdf>

[Non-Patent Literature 2]
3GPP, "Evolved Universal Terrestrial Radio Access (E-UTRA) and Evolved Universal Terrestrial Radio Access Network (E-UTRAN); Overall description; Stage2 (Release 12)", 3GPP TR 36.300 (V12.4.0), 2014

SUMMARY OF INVENTION

Technical Problem

If a communication system of the TDD mode is accommodated in an optical transmission system using different wavelengths in uplink and downlink, there is a "TDD non-transmission period" that is a period in which no data transmission is performed at each wavelength in the optical section in accordance with a timing of data transmission/reception in the communication system in conventional technology. Thus, there is a problem that bandwidth utilization efficiency is low because there are many unused periods even though a maximum transmission rate of the optical section is high.

Also, as illustrated in FIG. 11, it is conceivable that a PON system accommodating a wireless communication system and a PON system accommodating a communication system for providing another service such as an FTTH service are physically different networks. This leads to an increase in the number of cores of the optical fiber and the number of devices. Also, because there are users who do not require a high-speed property, a delay property, or the like, there is a possibility that there will be many free periods in a PON system on an FTTH or M2M side.

In view of the above circumstances, an objective of the present invention is to provide a transmission system and a transmission method capable of improving utilization efficiency when uplink and downlink communication of a communication system that performs a TDD mode is relayed and transmitted through signals of different wavelengths.

Solution to Problem

According to a first embodiment of the present invention, there is provided a transmission system for relaying communication of communication systems, the transmission system including: a relay unit configured to relay uplink communication and downlink communication of a communication system that performs a TDD mode through signals of different wavelengths; an information acquisition unit configured to acquire time division information indicating timings of the uplink communication and the downlink communication in the communication system that performs the TDD mode; a calculation unit configured to calculate a free period unused in relaying of communication of the communication system that performs the TDD mode on the basis of the time division information for each wavelength; and an instruction unit configured to instruct the relay unit to relay communication of another communication system different from the communication system that performs the TDD mode in the free period for each wavelength calculated by the calculation unit.

According to a second embodiment of the present invention, in the first embodiment, the information acquisition unit monitors the communication of the communication system that performs the TDD mode to be relayed by the relay unit to estimate the time division information.

According to a third embodiment of the present invention, in the second embodiment, the information acquisition unit estimates the time division information on the basis of traffic of a signal of the communication system that performs the TDD mode or information set in a signal of the communication system that performs the TDD mode.

According to a fourth embodiment, there is provided a transmission method to be executed by a transmission system for relaying communication of communication systems, the transmission method including: a relay step in which a relay unit relays uplink communication and downlink communication of a communication system that performs a TDD mode through signals of different wavelengths; an information acquisition step in which an information acquisition unit acquires time division information indicating timings of the uplink communication and the downlink communication in the communication system that performs the TDD mode; a calculation step in which a calculation unit calculates a free period unused in relaying of the uplink communication and the downlink communication of the communication system that performs the TDD mode on the basis of the time division information for each wavelength; and an instruction step in which an instruction unit instructs the relay unit to relay communication of another communication system different from the communication system that performs the TDD mode in the free period for each wavelength calculated in the calculation step.

Advantageous Effects of Invention

According to the present invention, it is possible to improve utilization efficiency when uplink and downlink communication of a communication system that performs a TDD mode is relayed and transmitted through signals of different wavelengths.

BRIEF DESCRIPTION OF DRAWINGS

FIG. 9 is a diagram illustrating a TDD frame of LTE according to the conventional technology.

DESCRIPTION OF EMBODIMENTS

Hereinafter, embodiments of the present invention will be described in detail with reference to the drawings.

In a network system according to an embodiment of the present invention, a transmission system that performs communication in an FDD mode has a configuration in which communication of a communication system based on a TDD mode is relayed. In the FDD mode, uplink and downlink communication is simultaneously performed through different frequencies. In the TDD mode, the uplink and the downlink share the same frequency band, and signals are orthogonal on the time axis. Hereinafter, the transmission system serves as an optical transmission system of an optical wavelength multiplexing transmission mode (also referred to as a wavelength division multiplexing (WDM) mode) that transmits uplink communication and downlink communication through signals of different wavelengths, and a communication system that is accommodated in an optical transmission system and performs communication in the TDD mode serves as a wireless communication system. The WDM mode is a type of FDD in optical transmission, and a frequency in the FDD mode corresponds to a wavelength for transmitting an optical signal in the WDM mode. Also, the transmission system is not limited to the optical transmission system. For example, the transmission system may perform transmission through a wavelength such as a wavelength of a radio frequency rather than a wavelength of light.

In addition to the wireless communication system, an optical transmission system of the embodiment accommodates another communication system that is tolerant of requirements of a high-speed property, a low-delay property, and the like (hereinafter also referred to as "another communication system") and relays communication of the wireless communication system and communication of the other communication system through the same optical fiber. At the time of this relay, the optical transmission system of the embodiment transmits data of the other communication system during a TDD non-transmission period of each wavelength through which TDD data of the wireless communication system is not transmitted. Thereby, the optical transmission system transmits a signal while sharing the wavelength in communication of the wireless communication system and communication of the other communication system. Through signal transmission sharing this wavelength, it is possible to reduce the number of cores and the number of devices.

Normally, if two or more communication systems are accommodated on the same optical fiber, they are logically divided into separate networks in order to prevent that the communication systems affect each other.

Figure 1:
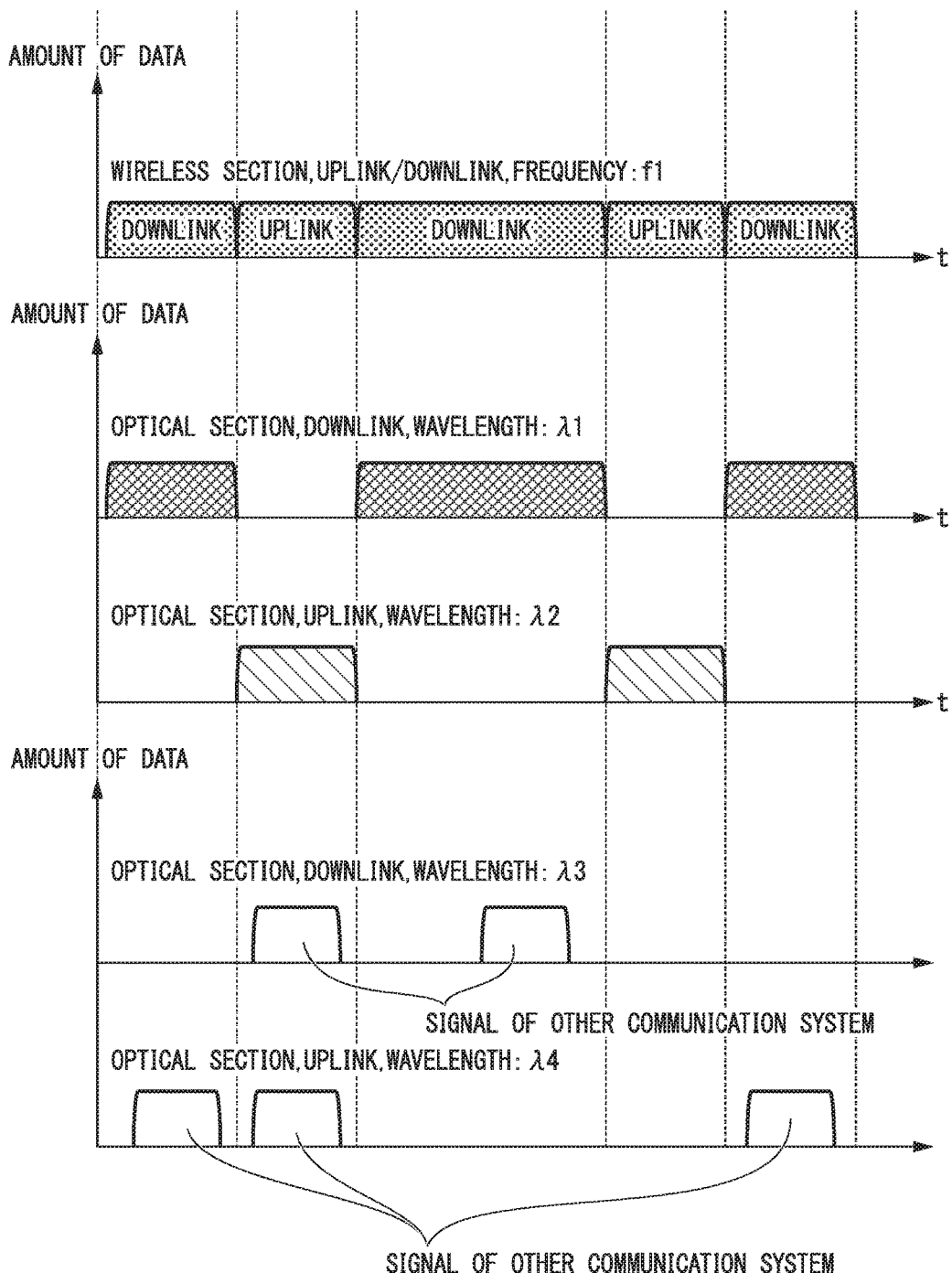
FIG. 1 is a diagram illustrating bandwidth utilization when a plurality of communication systems accommodated in the same optical fiber to which the present invention is applicable are logically provided as separate networks.

FIG. 1 is a diagram illustrating bandwidth utilization when a plurality of communication systems accommodated in the same optical fiber are logically separate networks. One of the plurality of communication systems is a wireless communication system. The wireless communication system performs uplink and downlink communication in the TDD mode using a wireless link of a frequency f1 in a wireless section with a mobile wireless terminal. In the optical section in which the optical transmission system transmits the optical signal through the optical fiber, a wavelength λ1 is used for relay transmission of downlink data of the wireless communication system and a wavelength λ2 is used for relay transmission of uplink data. Also, in the optical section, a wavelength λ3 is used for relay transmission of downlink data of the other communication system and a wavelength λ4 is used for relay transmission of uplink data.

In this manner, if a plurality of communication systems are logically accommodated as separate networks in the same optical fiber, it leads to an increase in the number of wavelengths to be used. Further, because the wireless communication system performs communication in the TDD mode, no data is transmitted at the wavelength λ2 when downlink data is transmitted at the wavelength λ1 and no data is transmitted at the wavelength λ1 when uplink data is transmitted at the wavelength λ2. Consequently, it cannot be said that the utilization efficiency of the wavelengths is high.

However, because a radio signal of the wireless communication system is not relayed and transmitted in the TDD non-transmission period at the wavelength λ1 and the wavelength λ2, an optical path thereof can be regarded as a logically independent optical path. Therefore, the optical transmission system of the present embodiment transmits data of the other communication system through this logically independent optical path. Thus, the optical transmission system of the embodiment acquires TDD subframe configuration information from the wireless communication system, determines the TDD non-transmission period of each wavelength, and transmits a signal of the other communication system for the period. Also, the TDD subframe configuration information is information for acquiring a subframe allocated to each of the uplink and the downlink and a start time of each subframe in the TDD mode in the wireless communication system. For example, in the case of TDD subframe configuration information indicating the subframe configuration illustrated in FIG. 9, the start time of the subframe is indicated by a position of the subframe within the frame, a time length allocated to the downlink is indicated by the number of continuous downlink subframes, and a time length allocated to the uplink is indicated by the number of continuous uplink subframes. That is, the TDD subframe configuration information is an example of time division information for acquiring timings of uplink communication and downlink communication of the wireless communication system (time slots, each of which is indicated by a start time and an end time).

Figure 2:
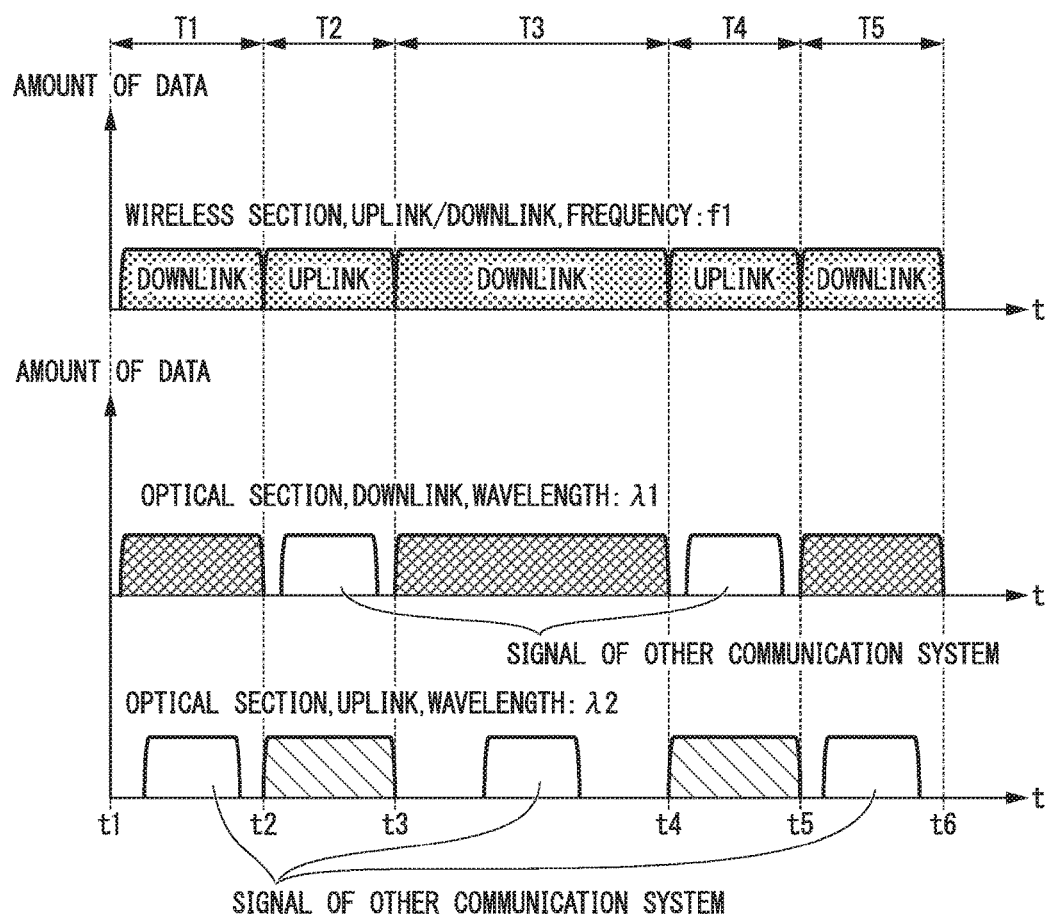
FIG. 2 is a diagram illustrating bandwidth utilization in an optical section of a network system according to an embodiment of the present invention.

FIG. 2 is a diagram illustrating bandwidth utilization in an optical section of a network system according to an embodiment of the present invention.

In addition to the wireless communication system, the network system of the embodiment accommodates another communication system that is tolerant of requirements of a high-speed property, a low-delay property, and the like (hereinafter also referred to as "another communication system") in the optical transmission system and relays communication of the wireless communication system and communication of the other communication system through the same optical fiber. The wireless communication system performs uplink and downlink communication in the TDD mode using a wireless link of a frequency f1 in a wireless section with a mobile wireless terminal. In the optical section of the optical transmission system, a downlink signal of the wireless communication system is relayed and transmitted through the downlink of a wavelength λ1 and an uplink signal of the wireless communication system is relayed and transmitted through the uplink of wavelength λ2 in the optical section. Further, the optical transmission system defines TDD non-transmission periods of the uplink and the downlink of the optical section, and transmits a signal of the other communication system for the TDD non-transmission periods. That is, the optical transmission system relays and transmits an uplink signal of the other communication system for the TDD non-transmission period of the uplink of the optical section. Also, the optical transmission system relays and transmits a downlink signal of the other communication system for the TDD non-transmission period of the downlink in the optical section.

Figure 3:
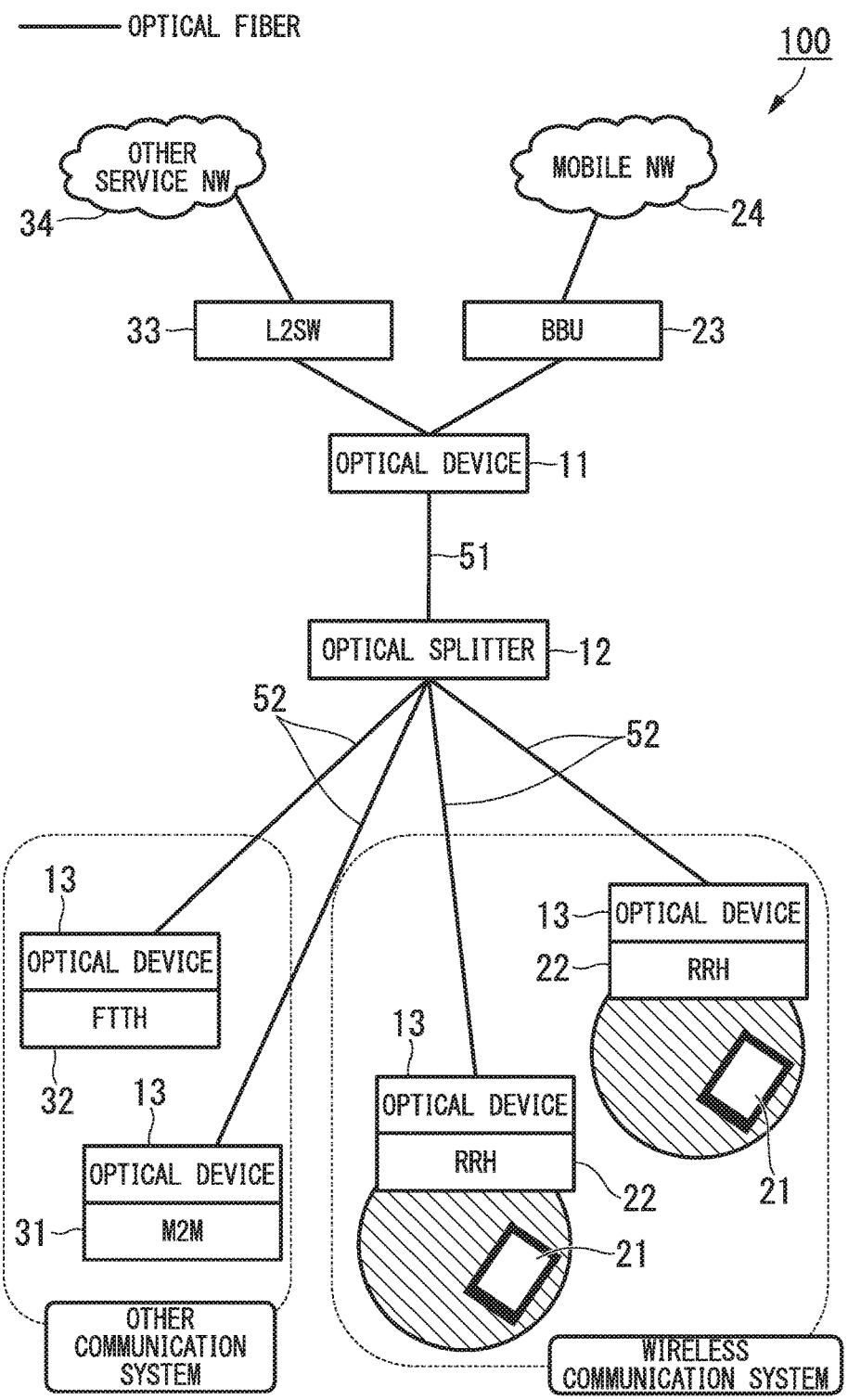
FIG. 3 is a configuration diagram of the network system of the embodiment.

FIG. 3 is a configuration diagram of a network system of an embodiment.

A network system 100 has a configuration in which an optical transmission system, which includes an optical device 1, an optical splitter 12, and optical devices 13, accommodates a wireless communication system and another communication system. The optical device 11 is an optical line device installed on the side of a communication provider, that is, a host-side optical device. The optical device 13 is an optical line device installed on a subscriber's house side, that is, a subordinate-side optical device. A direction from the optical device 11 to the optical device 13 is downlink, and a direction from the optical device 13 to the optical device 11 is uplink.

The optical transmission system is, for example, a PON system, the optical device 11 is an ONU (an optical subscriber line network device), and the optical device 13 is an OLT (an optical subscriber line termination device). The optical device 11 and the optical device 13 perform communication based on WDM using the wavelength λ1 for the downlink and the wavelength λ2 for the uplink. The optical splitter 12 splits a time division multiplexing (TDM) optical signal transmitted from the optical device 11 through a single optical fiber 51 to optical fibers 52 connected to a plurality of optical devices 13. Also, the optical splitter 12 multiplexes time division multiple access (TDMA) optical signals transmitted from the optical fibers 52 connected to the plurality of optical devices 13 and outputs a multiplexed signal to the optical fiber 51.

Also, although a case in which the optical transmission system is a PON system will be described below as an example, the optical transmission system may be configured with a ring type network or other network topology.

In the network system illustrated in FIG. 3, the optical transmission system relays communication between an RRH 22 and a BBU 23 of a wireless base station included in the wireless communication system. The RRH 22 connected to the optical device 13 is an antenna unit of a base station device and wirelessly communicates with a mobile wireless terminal 21 in the TDD mode using the frequency f1. The BBU 23 is a signal processing unit of the wireless base station, and is connected to a mobile network (NW) 24 via the optical device 11.

Further, the optical transmission system relays communication of another communication system which is a communication system different from the wireless communication system. In FIG. 3, the other communication system includes an FTTH system and an M2M system. A communication device 31 of the M2M system and a communication device 32 of the FTTH system communicate with another service NW 34 via the optical transmission system. The communication device 31 of the M2M system and the communication device 32 of the FTTH system are connected to the optical device 13. The optical device 11 is connected to another service NW 34 via a layer 2 switch (L2SW) 33. A signal of the other communication system has lower priority than a signal of the wireless communication system.

The network system 100 transmits data of other communication systems such as the FTTH and M2M systems for the TDD non-transmission period of the wireless communication system. Also, the FTTH and M2M systems can be accommodated in the same node instead of nodes separated from the wireless communication system. For example, the wireless communication system and the other communication system may be disposed in the same place and may share a single optical device 13.

Figure 4:
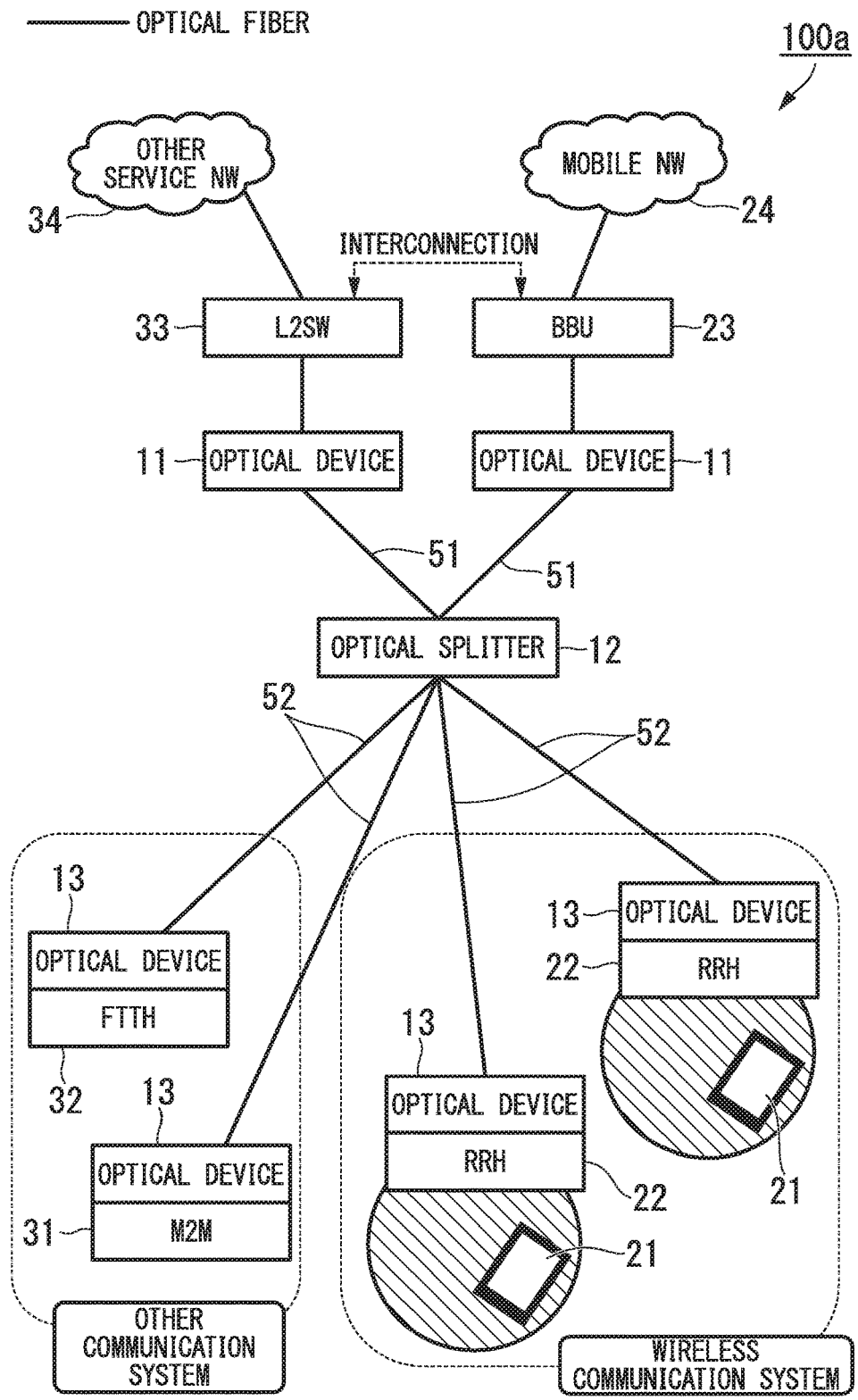
FIG. 4 is another configuration diagram of the network system of the embodiment.
Figure 10:
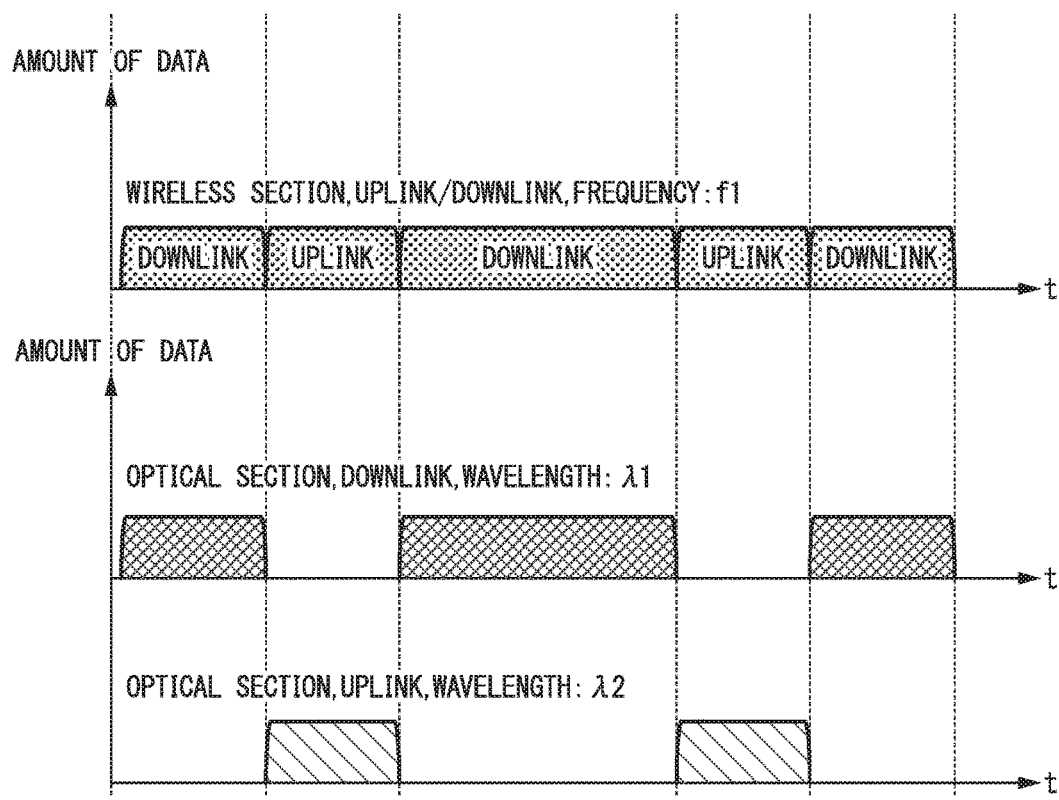
FIG. 10 is a diagram illustrating an example of bandwidth utilization of a wireless section and an optical section according to the conventional technology.
Figure 11:
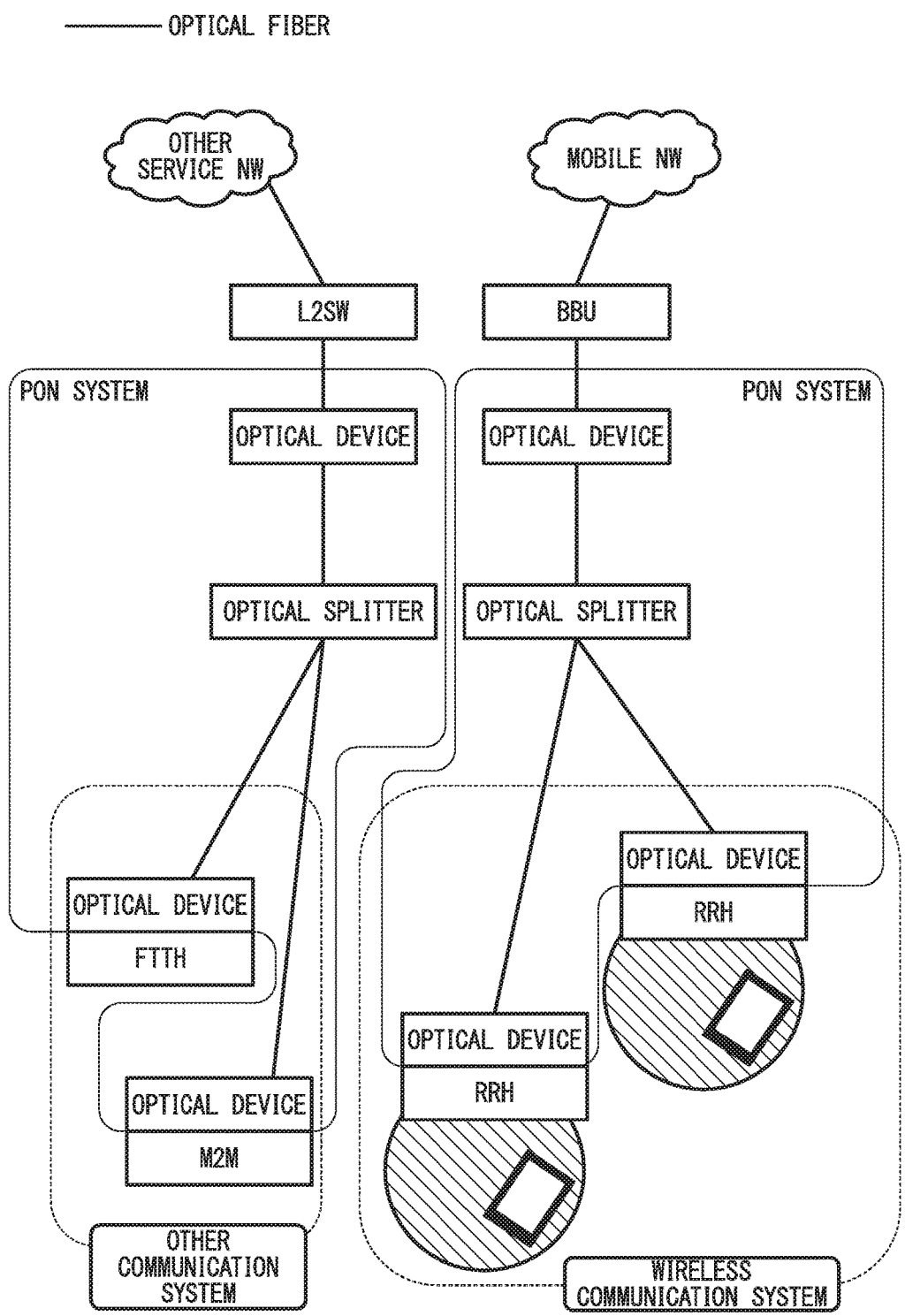
FIG. 11 is a diagram illustrating an example of a communication system using a PON system in an optical section according to the conventional technology.

FIG. 4 is another configuration diagram of a network system of an embodiment, in a network system 100a illustrated in FIG. 4, parts that are the same as those of the network system 100 illustrated in FIG. 3 are denoted by the same reference signs, and description thereof will be omitted. The network system 100a illustrated in FIG. 4 includes a plurality of optical devices 11, and these optical devices 11 transmit and receive signals in cooperation with each other. The optical transmission system including the optical devices 11, an optical splitter 12, and optical devices 13 in the network system 100a is not a general configuration used for the PON system. That is, a signal to be transmitted and received by a host-side optical device is conventionally a continuous signal, whereas a signal to be transmitted and received by each optical device 11 provided in the network system 100a is a burst signal. The optical splitter 12 splits a TDM optical signal transmitted from each optical device 11 to optical fibers 52 connected to the optical devices 13, respectively. Also, downlink signals are not simultaneously transmitted from the two optical devices 11. Also, the optical splitter 12 multiplexes time division multiple access (TDMA) optical signals transmitted from the optical fibers 52 connected to the plurality of optical devices 13 for each optical device 11 in accordance with a transmission destination and outputs a multiplexed signal Also, in the optical section illustrated in FIG. 10, the signal of the wireless communication system may be transmitted for the TDD non-transmission period. For example, if an interface that continuously transmits a continuous signal regardless of an amount of information in the wireless communication system is used, an empty frame for which information to be transmitted/received in the wireless communication system is not set is transmitted in the optical section even for the TDD non-transmission period. In this case, it is possible to prevent an empty frame from being transmitted in a TDD non-transmission section by performing a transmission stop process according to the conventional technology. The transmission stop process of the conventional technology is described in, for example, PCT International Publication No. WO 2014/061552. In the transmission stop process of the conventional technology, a transmission stop timing is determined on the basis of bandwidth allocation information of the wireless communication system. However, in the present embodiment, the transmission stop timing is determined on the basis of TDD subframe configuration information.

Hereinafter, specific embodiments of the network system 100 or 100a will be described.

First Embodiment

The first embodiment is a case in which an optical transmission system and a wireless communication system cooperate with each other. The optical device 11 in the first embodiment is an OLT 110 illustrated in FIG. 5, and the optical device 13 is an ONU similar to that of the conventional technology.

Figure 5:
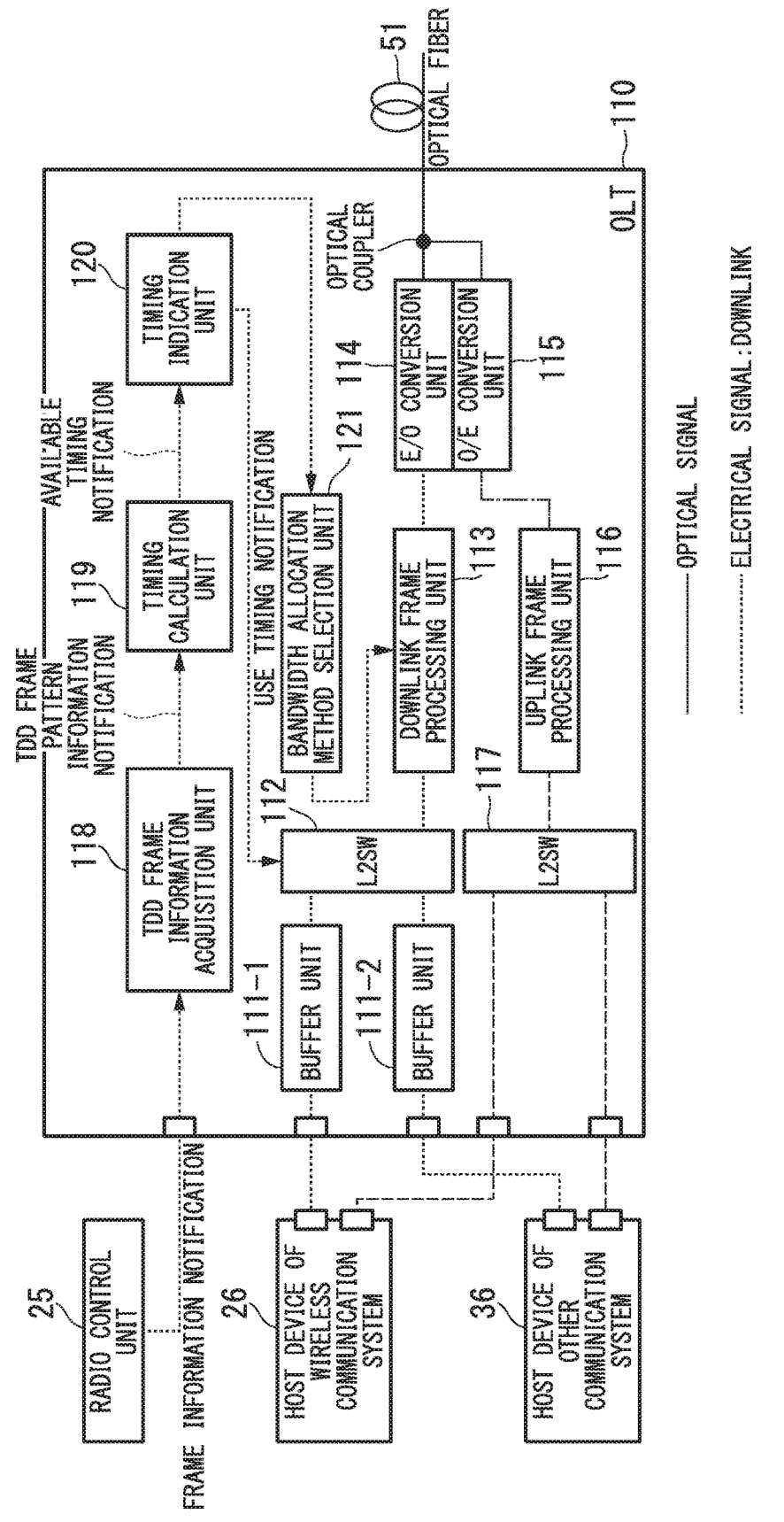
FIG. 5 is a functional block diagram illustrating a configuration of an optical line terminal (OLT) according to a first embodiment.

FIG. 5 is a functional block diagram illustrating a configuration of the OLT 110 according to the first embodiment. In FIG. 5, only functional blocks related to the first embodiment are extracted and illustrated. The OLT 110 is an example of the optical device 11 included in the network system 100 or the network system 100a. The OLT 110 is connected to a radio control unit 25 provided in the control device of the wireless communication system, a host device 26 of the wireless communication system, and a host device 36 of the other communication system. The radio control unit 25 controls a wireless base station included in the wireless communication system. The host device 26 of the wireless communication system is a representative wireless base station that controls a plurality of wireless base stations of the wireless communication system in the case of a mobile backhaul configuration, and is a BBU that performs signal processing of the wireless base station in the case of mobile fronthaul. The host device 36 of the other communication system includes an aggregating unit that aggregates an FTTH service and an M2M service, and is connected to a host network such as another service NW 34. Also, the OLT 110 is connected to the ONU as the optical device 13 via the optical fiber 51 and the optical fiber 52. The ONU is connected to a subordinate device of the wireless communication system or a subordinate device of the other communication system. The subordinate device of the wireless communication system is a wireless base station when mobile backhaul is configured and is an RRH when mobile fronthaul is configured. Also, the subordinate device of the other communication system is, for example, the communication device 31 of the M2M system or the communication device 32 of the FTTH system.

The OLT 110 includes a buffer unit 111-1, a buffer unit 111-2, an L2SW 112, a downlink frame processing unit 113, an electrical-to-optical (E/O) conversion unit 114, an optical-to-electrical (O/E) conversion unit 115, an uplink frame processing unit 116, an L2SW 117, a TDD frame information acquisition unit 118 (an information acquisition unit), a timing calculation unit 119 (a calculation unit), a timing indication unit 120 (an instruction unit), and a bandwidth allocation method selection unit 121 (the instruction unit). A relay unit that relays communication of the communication system includes the buffer unit 111-1, the buffer unit 111-2, the L2SW 112, the downlink frame processing unit 113, the E/O conversion unit 114, the O/E conversion unit 115, the uplink frame processing unit 116, and the L2SW 117.

The buffer unit 111-1 temporarily stores a downlink data signal received from the host device 26 of the wireless communication system and then outputs the downlink data signal. The buffer unit 111-2 temporarily stores a downlink data signal received from the host device 36 of the other communication system, and then outputs the downlink data signal.

The L2SW 112 inputs a downlink data signal from the buffer unit 111-1 or the buffer unit 111-2 in accordance with a control signal from the timing indication unit 120, and outputs the downlink data signal to the downlink frame processing unit 113. The downlink frame processing unit 113 adds the control signal output from the bandwidth allocation method selection unit 121 to the downlink data signal input from the L2SW 112 to generate a transmission sequence of the downlink signal and then converts the transmission sequence into a frame to be used in the PON system. The E/O conversion unit 114 converts the downlink signal converted into the frame by the downlink frame processing unit 113 from an electrical signal into an optical signal of the wavelength λ1, and outputs the optical signal to the optical fiber 51. The optical signal propagates through the optical fiber 51 and the optical fiber 52 and is transmitted to the ONU.

The O/E conversion unit 115 receives an optical signal of the wavelength λ2 transmitted by the ONU and propagated through the optical fiber 52 and the optical fiber 51. The O/E conversion unit 115 converts the received optical signal into an electrical signal and outputs the electrical signal to the uplink frame processing unit 116. The uplink frame processing unit 116 converts a frame of the uplink signal converted into the electrical signal by the O/E conversion unit 115 from a PON frame into a desired frame, extracts an uplink data signal, and outputs the uplink data signal to the L2SW 117. The L2SW 117 outputs the uplink data signal. Input from the uplink frame processing unit 116 to the host device 26 of the wireless communication system or the host device 36 of the other communication system in accordance with a destination.

The TDD frame information acquisition unit 118 is an interface for receiving a TDD subframe configuration from the radio control unit 25. The TDD frame information acquisition unit 118 receives a frame information notification in which TDD frame pattern information indicating the TDD subframe configuration of the wireless communication system is set as a control signal from the radio control unit 25. The TDD frame information acquisition unit 118 notifies a timing calculation unit 119 of the TDD frame pattern information extracted from the frame information notification. The timing calculation unit 119 calculates available timings of the uplink and the downlink of each of the wireless communication system and the optical transmission system on the basis of an uplink use time slot and a downlink use time slot of the wireless communication system obtained from the TDD subframe configuration indicated by the TDD frame pattern information. Specifically, the available timings are a time slot to be allocated to the uplink of each of the wireless communication system and the other communication system and a time slot to be allocated to the downlink of each of the wireless communication system and the other communication system. The time slot is indicated by a start time and an end time. The timing calculation unit 119 notifies the timing indication unit 120 of a calculation result.

The timing indication unit 120 notifies the L2SW 112 of downlink available timings of the wireless communication system and the other communication system in accordance with the calculation result of the timing calculation unit 119. That is, the tuning indication unit 120 outputs a control signal indicating whether to output a downlink data signal of either the wireless communication system or the other communication system to the downlink frame processing unit 113 to the L2SW 112 at a timing according to an allocated time slot of each of the downlink of the wireless communication system and the downlink of the other communication system. Also, if there is provided a switching function of switching the downlink data signal output from the buffer unit 111-1 and the downlink data signal output from the buffer unit 111-2 and outputting the downlink data signals to the downlink frame processing unit 113, a switch having another switch mechanism may be used instead of the L2SW 112.

Also, the timing indication unit 120 also has a mechanism for an uplink transmission timing notification. In the PON system, a dynamic bandwidth allocation (DBA) mode is generally used as an uplink bandwidth allocation technique. DBA is described in, for example, Literature "NTT Technical Journal, Technology Basic Course [GB-PON Technology], Part 3; DBA Function", [online], 2005, Nippon Telegraph and Telephone Corporation, Internet <URL http://www.ntt.co.jp/journal/0510/files/jn200510067.html>.

Specifically, the ONU accumulates received uplink data in a buffer. The ONU notifies the OLT of an accumulated amount of uplink data through a REPORT frame. The OLT calculates a transmission start time and a transmission amount of uplink data to be allocated to the ONU as a transmission source of the REPORT frame on the basis of the amount of uplink data of each ONU and notifies of the transmission start time and the transmission amount of the uplink data through a GATE frame. The ONU transmits the uplink data at the transmission start time in accordance with allocation set in the GATE frame.

However, types of DBA used in each PON system are not always the same. For example, a method of reducing a delay on the basis of scheduling information of a wireless communication system in DBA used by a wireless communication system has also been proposed (for example, see PCT International Publication No. WO 2014/077168). Therefore, if the timing indication unit 120 determines a service to be provided by the network system (a wireless communication service to be provided by the wireless communication system or a service to be provided by the other communication system) in any method, the bandwidth allocation method selection unit 121 is notified of the determined service.

The bandwidth allocation method selection unit 121 determines a type of DBA to be used for uplink bandwidth allocation in accordance with a type of service in the notification provided from the timing indication unit 120. The bandwidth allocation method selection unit 121 determines a transmission start time and a bandwidth of an uplink signal to be allocated to the ONU on the basis of the type of DBA and the calculation result of the timing calculation unit 119. The bandwidth allocation method selection unit 121 generates a control signal for notifying of the transmission start time and the bandwidth of the uplink signal allocated to the ONU for the ONU and outputs the control signal to the downlink frame processing unit 113. Thereby, the control signal is transmitted to the destination ONU.

An operation of the OLT 110 will be described.

The buffer unit 111-1 buffers a downlink data signal received from the host device 26 of the wireless communication system and the buffer unit 111-2 buffers a downlink data signal received from the host device 36 of the other communication system.

On the other hand, when a frame information notification is received, the TDD frame information acquisition unit 118 acquires TDD frame pattern information and outputs the TDD frame pattern information to the timing calculation unit 119. The timing calculation unit 119 calculates a time slot allocated to each of the uplink and the downlink of the wireless communication system on the basis of an uplink use time slot and a downlink use time slot obtained from a TDD subframe configuration indicated by the TDD frame pattern information. For example, as illustrated in FIG. 2, in the wireless communication system, the downlink is allocated to a time slot T1 from a time t1 to a time t2, the uplink is allocated to a time slot T2 from the time t2 to a time t3, the downlink is allocated to a time slot T3 from the time t3 to a time t4, the uplink is allocated to a time slot T4 from the time t4 to a time t5, and the downlink is allocated to a time slot T5 from the time t5 to a time t6. In this case, the downlink time slots T2 and T4 and the uplink time slots T1, T3, and T5 are TDD non-transmission periods. The timing calculation unit 119 allocates the downlink to the other communication systems in the time slots T2 and T4 and allocates the uplink to the other communication systems in the time slots T1, T3, and T5. The timing calculation unit 119 outputs the calculation result to the timing indication unit 120.

The timing indication unit 120 outputs a control signal indicating one of the buffer unit 111-1 and the buffer unit 111-2 from which the downlink data signal is input to the L2SW 112 according to the timing according to the calculation result of the timing calculation unit 119. For example, the timing indication unit 120 controls the L2SW 112 so that reading from the buffer unit 111-1 is performed at the time t1, reading from the buffer unit 111-2 is performed at the time t2, and reading from the buffer unit 111-1 is performed at the time t3. The downlink data signal input by the L2SW 112 is subjected to frame conversion by the downlink frame processing unit 113 and converted into an optical signal by the E/O conversion unit 114 and the optical signal is transmitted to the ONU. Further, the timing indication unit 120 notifies the bandwidth allocation method selection unit 121 of a type of DBA, a time slot allocated to the uplink, and a time slot allocated to the downlink for each of the wireless communication system and the other communication system.

On the other hand, when an uplink data signal is received from the subordinate device, the ONU buffers the uplink data signal and transmits an uplink control signal in which the REPORT frame is set to the OLT 110. The O/E conversion unit 115 of the OLT 110 receives an optical signal transmitted by the ONU and propagated through the optical fiber 52 and the optical fiber 51. The O/E conversion unit 115 converts the received optical signal into an electrical signal. The uplink frame processing unit 116 extracts the REPORT frame which is the uplink control signal from the uplink signal converted into the electrical signal and outputs the REPORT frame to the bandwidth allocation method selection unit 121.

The bandwidth allocation method selection unit 121 determines a transmission start time and an amount of transmission to be allocated to the ONU that is a transmission source of the REPORT frame. The transmission start time and the amount of transmission are determined on the basis of a type of DBA, an uplink time slot allocated to each of the wireless communication system and the other communication system, and the number of uplink data signals set in a received REPORT frame and a REPORT frame previously received from another ONU. For example, if the REPORT frame is received from the ONU connected to the subordinate device of the wireless communication system, the bandwidth allocation method selection unit 121 determines a transmission start time period for which the uplink data signal can be transmitted in the time slots T2 and T4 and an amount of transmission. Also, for example, if the REPORT frame is received from the ONU connected to the subordinate device of the other communication system, the bandwidth allocation method selection unit 121 determines a transmission start time period for which the uplink data signal can be transmitted in the time slots T1, T3, and T5 and an amount of transmission. The bandwidth allocation method selection unit 121 outputs a GATE frame in which the transmission start time and the amount of transmission allocated to the ONU serving as the transmission source of the REPORT frame are set as a downlink control signal to the downlink frame processing unit 113. The downlink frame processing unit 113 adds a downlink control signal in which the GATE frame is set to the downlink data signal and performs frame conversion on the downlink data signal. The E/O conversion unit 114 converts a transmission signal obtained by the frame conversion into an optical signal and outputs the optical signal. The ONU transmits a buffered uplink data signal to the OLT 110 in accordance with the transmission start time and the amount of transmission indicated in the GATE frame.

The O/E conversion unit 135 of the OLT 110 receives the optical signal transmitted by the ONU and propagated through the optical fiber 52 and the optical fiber 51. The O/E conversion unit 115 converts the received optical signal into an electrical signal, and outputs the electrical signal to the uplink frame processing unit 116. The uplink frame processing unit 116 converts a frame of an uplink signal converted into an electrical signal, acquires uplink data signal, and outputs the uplink data signal to the L2SW 117. The L2SW 117 outputs the uplink data signal input from the uplink frame processing unit 116 to the host device 26 of the wireless communication system or the host device 36 of the other communication system in accordance with a destination of the signal.

Also, while communication is not permitted for a communication system which is not selected as an object of communication permission in the OLT 110, it is possible to reduce power consumption by turning off a power supply of the ONU connected to the communication system (putting the power supply of the ONU to sleep).

Also, the buffer unit 111-1, the buffer unit 111-2, the L2SW 112, the L2SW 117, the TDD frame information acquisition unit 118, the timing calculation unit 119, the timing indication unit 120, and the bandwidth allocation method selection unit 121 may be mounted in a device independent of the OLT 110. In this case, a similar operation is performed by connecting the OLT to the host device 26 of the wireless communication system and the host device 36 of the other communication system as external adapters. If they are used as the adapters, the optical device 11 and the optical device 13 can also be operated in a conventional device.

Also, the TDD frame information acquisition unit 118, the timing calculation unit 119, and the timing indication unit 120 may be configured to be provided in the ONU. In this case, a frame information notification indicating a TDD subframe configuration of the wireless communication system is transmitted from the subordinate device of the wireless communication system (e.g., an RRH) to the TDD frame information acquisition unit 118 provided in the ONU. A control signal to be transmitted from the timing indication unit 120 of the ONU to the L2SW 112 of the OLT and notification information provided to the bandwidth allocation method selection unit 121 are transmitted from the ONU to the OLT through the uplink control signal. The bandwidth allocation method selection unit 121 of the OLT can acquire a control signal for selecting the type of DBA from the ONU connected to the subordinate device of each communication system and operate a type of DBA selected in accordance with each communication system.

Second Embodiment

In the first embodiment, the optical transmission system and the wireless communication system transmit and receive information using a dedicated interface different from the interface for transmitting and receiving the uplink data signal and the downlink data signal, and are in cooperation with each other. In the second embodiment, a dedicated interface is not provided between the optical transmission system and the wireless communication system. The optical transmission system monitors communication of a relaying wireless communication system and estimates a TDD subframe configuration without receiving information about the TDD subframe configuration from the wireless communication system.

Figure 6:
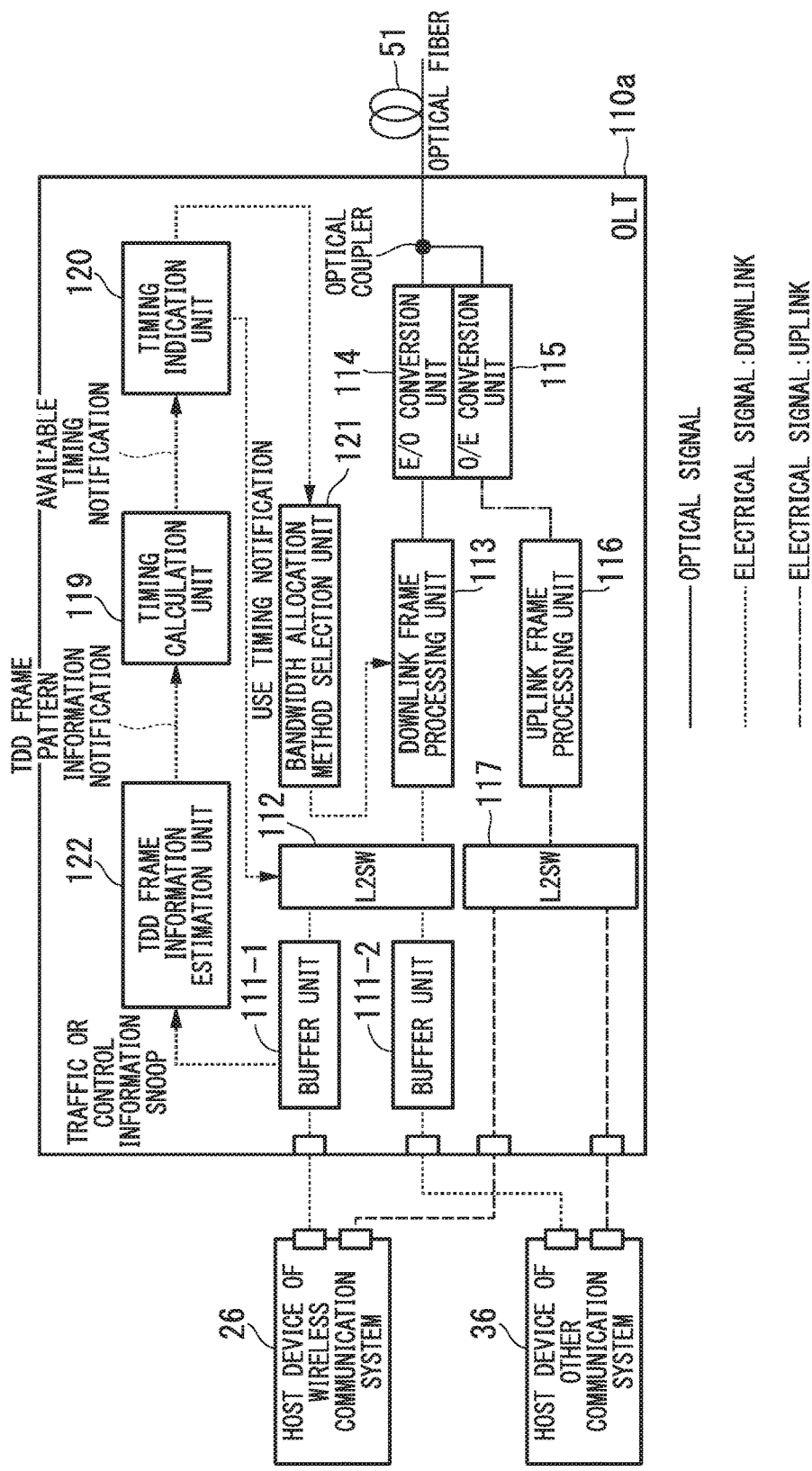
FIG. 6 is a functional block diagram illustrating a configuration of an OLT according to a second embodiment.

FIG. 6 is a functional block diagram illustrating a configuration of an OLT 110a according to the second embodiment. In FIG. 6, parts that are the same as those of the device according to the first embodiment illustrated in FIG. 5 are denoted by the same reference signs, and description thereof will be omitted. The OLT 110a illustrated in FIG. 6 is different from the OLT 110 illustrated in FIG. 5 in that a TDD frame information estimation unit 122 (an information acquisition unit) is provided instead of the TDD frame information acquisition unit 118. The OLT 110a does not receive the TDD subframe configuration information that the OLT 110 of the first embodiment receives from the radio control unit 25 and the TDD frame information estimation unit 122 estimates the TDD subframe configuration information. Estimation is performed by monitoring signals transmitted and received by the host device 26 of the wireless communication system. Specifically, the estimation is performed on the basis of traffic of a data signal transmitted and received by the host device 26 of the wireless communication system or by snooping information set in a data signal transmitted and received by the host device 26 of the wireless communication system. Although an example in which the TDD subframe configuration information is estimated by monitoring the data signal received from the host device 26 of the wireless communication system is shown below, a signal transmitted from the L2SW 117 to the host device 26 of the wireless communication system may be further used for estimation.

The data signal transmitted by the host device 26 of the wireless communication system is buffered in the buffer unit 111-1. The buffer unit 111-1 outputs the buffered data signal to the TDD frame information estimation unit 122. A functional unit that branches the data signal received from the host device 26 of the wireless communication system and outputs the data signal to the TDD frame information estimation unit 122 is not necessarily the buffer unit 111-1 and may be configured using a distributor or the like.

The TDD frame information estimation unit 122 estimates a TDD subframe configuration, that is, a transmission pattern of uplink/downlink traffic, on the basis of the data signal transmitted from the host device 26 of the wireless communication system. Typical methods of estimating the TDD subframe configuration include a method of estimating the TDD subframe configuration from a transmission pattern of traffic (the amount of time-series data signals), a method of estimating the TDD subframe configuration by snooping predetermined setting content of control information set in a data signal, and a method of discriminating the TDD subframe configuration on the basis of header information set in a frame of the data signal.

The TDD frame information estimation unit 122 notifies the timing calculation unit 119 of TDD frame pattern information indicating the estimated TDD subframe configuration. The subsequent processing is similar to that of the first embodiment.

The buffer unit 111-1, the buffer unit 111-2, the L2SW 112, the L2SW 117, the TDD frame information estimation unit 122, the timing calculation unit 119, the timing indication unit 120, and the bandwidth allocation method selection unit 121 of the second embodiment can also be mounted as a device independent of the OLT 110a. In this case, a similar operation is performed by connecting the OLT to the host device of the wireless communication system and the host device of the other communication system as external adapters.

Also, the TDD frame information estimation unit 122, the timing calculation unit 119, and the timing indication unit 120 may be configured to be provided in the ONU. In this case, the TDD frame information estimation unit 122 provided in the ONU monitors a data signal transmitted and received by the subordinate device (e.g., an RRH) of the wireless communication system and estimates the TDD sub frame configuration. A control signal to be transmitted from the timing indication unit 120 provided in the ONU to the L2SW 112 of the OLT and notification information provided to the bandwidth allocation method selection unit 121 are transmitted from the ONU to the OLT through an uplink control signal. The bandwidth allocation method selection unit 121 of the OLT can acquire a control signal for selecting a type of DBA from the ONU connected to the subordinate device of each communication system and operate the type of DBA selected in accordance with each communication system.

Third Embodiment

In the network system 100 illustrated in FIG. 3, the wireless communication system and the other communication system are installed in different places. However, it is also conceivable that a single optical device 13 is shared and used by an RRH 11 which is a subordinate device of the wireless communication system and communication devices 31 and 32 which are subordinate devices of the other communication system. In the third embodiment, the optical device 13 is shared between the subordinate device of the wireless communication system and the subordinate device of the other communication system. Hereinafter, an example in which the optical device 13 is an ONU will be described.

Figure 7:
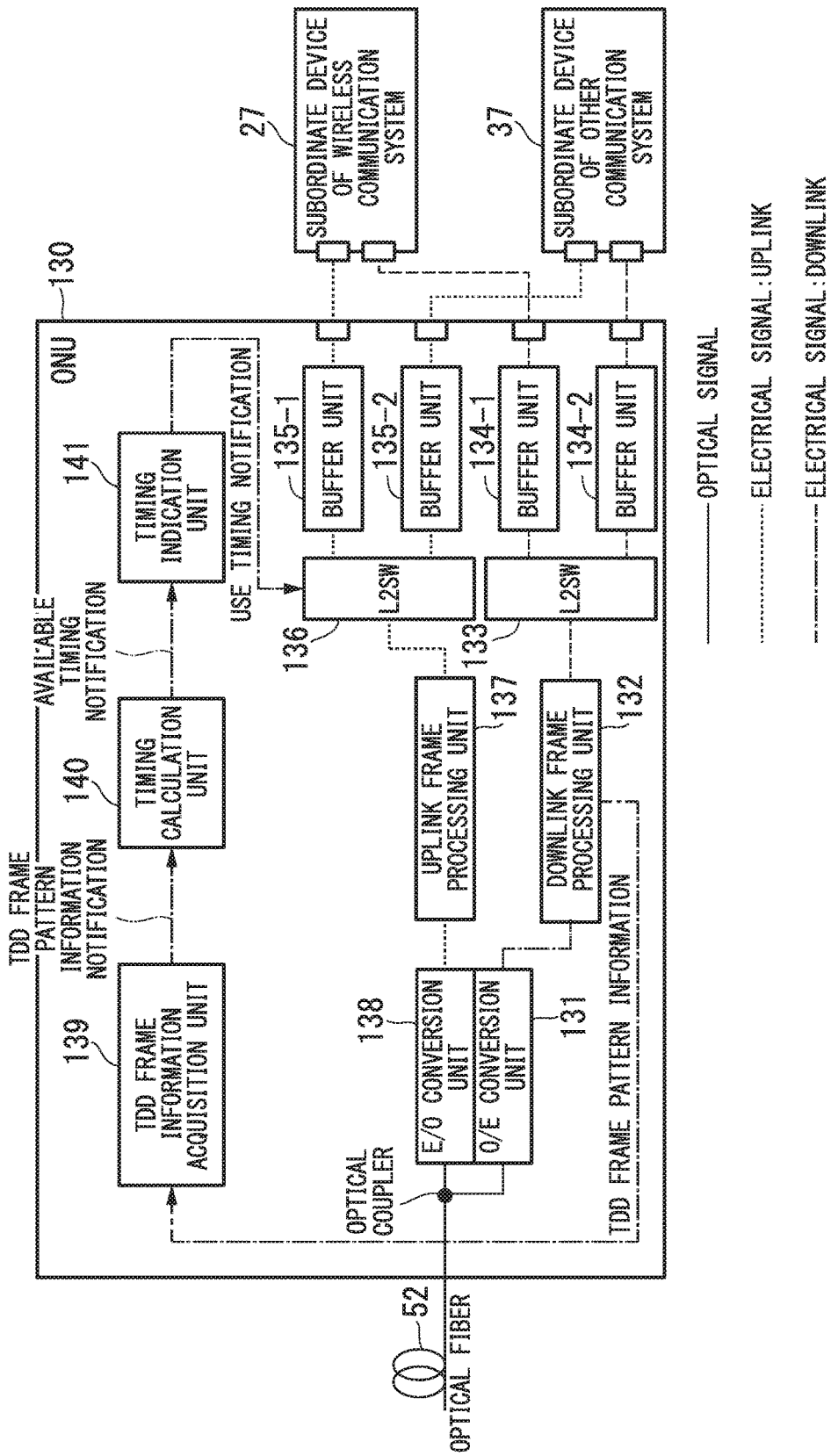
FIG. 7 is a functional block diagram illustrating a configuration of an optical network unit (ONU) according to a third embodiment.
Figure 8:
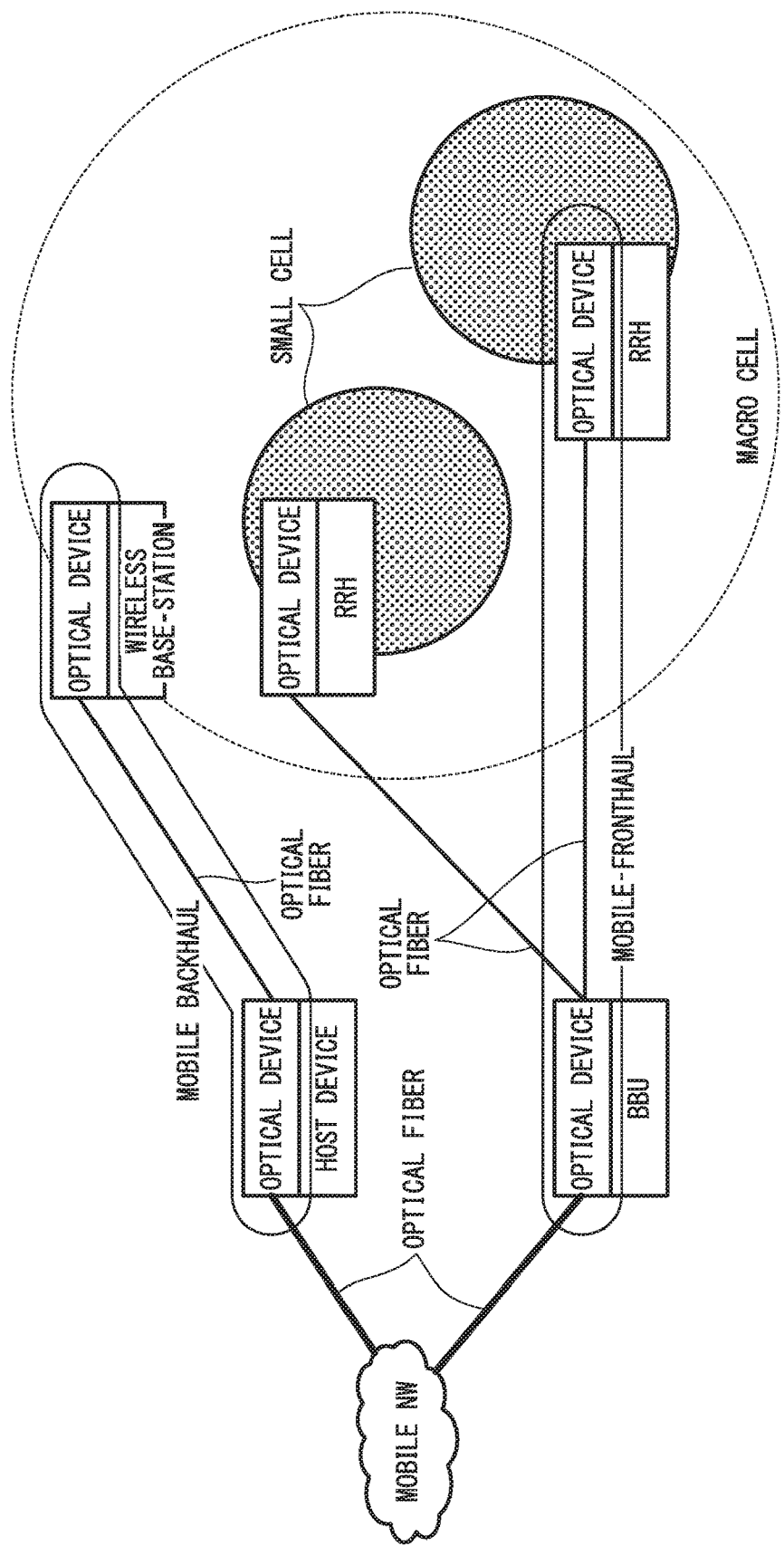
FIG. 8 is a diagram illustrating a configuration example of mobile fronthaul and mobile backhaul according to the conventional technology.

FIG. 7 is a functional block diagram illustrating a configuration of the ONU 130 according to the third embodiment. In FIG. 7, only functional blocks related to the third embodiment are extracted and illustrated. The ONU 130 is connected to the subordinate device 27 of the wireless communication system and the subordinate device 37 of another communication system. The subordinate device 27 of the wireless communication system is a wireless base station when mobile backhaul is configured and is an RRH when mobile fronthaul is configured. Also, the subordinate device 37 of the other communication system is the communication device 31 of the M2M system, the communication device 32 of the FTTH system, or the like and is, for example, a subscriber home device in the case of the communication device 32 of the FTTH system. Also, the ONU 130 is connected to the OLT as the optical device 11 via the optical fiber 51 and the optical fiber 52. The OLT has a configuration similar to that of the prior art, preferentially transmits the downlink data signal of the wireless communication system according to priority control, and transmits the downlink data signal of the other communication system if there is no downlink data signal of the wireless communication system.

The ONU 130 includes an O/E conversion unit 131, a downlink frame processing unit 132, an L2SW 133, a buffer unit 134-1, a buffer unit 134-2, a buffer unit 135-1, a buffer unit 135-2, an L2SW 136, an uplink frame processing unit 137, an E/O conversion unit 138, a TDD frame information acquisition unit 139 (an information acquisition unit), a timing calculation unit 140 (a calculation unit), and a timing indication unit 141 (an instruction unit). The O/E conversion unit 131, the downlink frame processing unit 132, the L2SW 133, the buffer unit 134-1, the buffer unit 134-2, the buffer unit 135-1, the buffer unit 135-2, the L2SW 136, the uplink frame processing unit 137, and the E/O conversion unit 138 constitute a relay unit that relays communication of a plurality of communication systems.

The O/E conversion unit 131 receives an optical signal of a wavelength λ1 output from the ONU serving as the optical device 11 to the optical fiber 51 from the optical fiber 52. The O/E conversion unit 131 converts the received optical signal into an electrical signal, and outputs the electrical signal to the downlink, frame processing unit 132. The downlink frame processing unit 132 converts a frame of the signal converted into the electrical signal by the O/E conversion unit 115 from a PON frame into a desired frame, and separates the frame into a downlink data signal and a control signal. The downlink frame processing unit 132 outputs the downlink data signal to the L2SW 133 and outputs the control signal to the TDD frame information acquisition unit 139. The L2SW 133 outputs the downlink data signal input from the downlink frame processing unit 132 to the buffer unit 134-1 or the buffer unit 134-2 in accordance with the destination or the like set in the header information or the like. The L2SW 133 outputs the downlink data signal to the buffer unit 134-1 if the downlink data signal is destined for the subordinate device 27 of the wireless communication system, and outputs the downlink data signal to the buffer unit 134-2 if the downlink data signal, is destined for the subordinate device 37 of the other communication system. The buffer unit 134-1 buffers the downlink data signal input from the L2SW 133, and outputs the downlink data signal to the subordinate device 27 of the wireless communication system. The buffer unit 134-2 buffers the downlink data signal input from the L2SW 133 and outputs the downlink data signal to the subordinate device 37 of the other communication system.

The buffer unit 135-1 temporarily stores an uplink data signal received from the subordinate device 27 of the wireless communication system and then outputs the uplink data signal. The buffer unit 135-2 temporarily stores an uplink data signal received from the subordinate device 37 of the other communication system and then outputs the uplink data signal. The L2SW 136 inputs the uplink data signal from the buffer unit 135-1 or the buffer unit 135-2 in accordance with a control signal from the timing indication unit 141, and outputs the uplink data signal to the uplink frame processing unit 137. The uplink frame processing unit 137 converts the uplink data signal input from the L2SW 136 into a frame to be used in the PON system. The E/O conversion unit 138 converts the uplink data signal converted into the frame by the uplink frame processing unit 137 from the electrical signal into an optical signal of a wavelength λ2, and outputs the optical signal to the optical fiber 52. The optical signal propagates through the optical fiber 52 and the optical fiber 51 and is transmitted to the ONU.

The TDD frame information acquisition unit 139 acquires TDD frame pattern information from the control signal separated by the downlink frame processing unit 132. The TDD frame information acquisition unit 139 outputs the acquired TDD subframe pattern information to the liming calculation unit 140.

Similar to the timing calculation unit 119 of the first embodiment, the timing calculation unit 140 calculates available timings of the uplink and downlink of each of the wireless communication system and the other communication system on the basis of an uplink use time slot and a downlink use time slot of the wireless communication system obtained from the TDD subframe configuration indicated by the TDD frame pattern information. The timing calculation unit 140 notifies the timing indication unit 141 of a calculation result. Similar to the timing indication unit 120 of the first embodiment, the timing indication unit 141 also notifies the L2SW 136 of available timings of uplinks of the wireless communication system and the other communication system in accordance with the calculation result of the timing calculation unit 140. That is, the timing indication unit 141 transmits a control signal to the L2SW 136 at a timing according to an allocated time slot of each of the uplink of the wireless communication system and the uplink of the other communication system, performs switching of an uplink data signal to be output to the uplink frame processing unit 137, and configures a logically independent optical path.

An operation in the third embodiment will be described.

The OLT receives a frame information notification in which TDD frame pattern information is set from the host device 26 of the wireless communication system of the first embodiment and transmits a control signal in which TDD frame pattern information acquired from the received frame information notification is set to the ONU 130 through an optical signal. Alternatively, the OLT transmits a control signal in which TDD frame pattern information indicating a TDD subframe configuration estimated in a manner similar to that of the TDD frame information estimation unit 122 of the second embodiment is set to the GNU 130 through an optical signal.

The O/E conversion unit 131 of the ONU 130 receives the optical signal transmitted by the OLT and propagated through the optical fiber 51 and the optical fiber 52. The O/E conversion unit 131 converts the received optical signal into an electrical signal and outputs the electrical signal to the downlink frame processing unit 132. The uplink frame processing unit 137 converts a frame of the uplink signal converted into the electrical signal to separate the frame into a control signal and an uplink data signal. The uplink frame processing unit 137 outputs the control signal to the TDD frame information acquisition unit 139. The TDD frame information acquisition unit 139 acquires the TDD frame pattern information from the control signal and outputs the TDD frame pattern information to the timing calculation unit 140.

The timing calculation unit 140 calculates a time slot allocated to each of the uplink, and the downlink, of the wireless communication system on the basis of an uplink, use time slot and a downlink use time slot obtained from the FDD subframe configuration indicated by the TDD frame pattern information. For example, as illustrated in FIG. 2, in the wireless communication system, the downlink is allocated to a time slot T1 from a time t1 to a time t2, the uplink is allocated to a time slot T2 from the time t2 to a time t3, the downlink is allocated to a time slot T3 from the time t3 to a time t4, the uplink is allocated to a time slot T4 from the time t4 to a time t5, and the downlink is allocated to a time slot T5 from the time t5 to a time t6. In this case, the downlink time slots T2 and T4 and the uplink time slots T1, T3, and T5 are TDD non-transmission periods. The timing calculation unit 119 allocates the downlink to the other communication systems in the time slots T2 and T4 and allocates the uplink to the other communication systems in the time slots T1, T3, and T5. The timing calculation unit 140 outputs the calculation result to the timing indication unit 141.

The buffer unit 135-1 buffers an uplink data signal received from the subordinate device 27 of the wireless communication system and the buffer unit 135-2 buffers the uplink data signal received from the subordinate device 37 of the other communication system. The timing indication unit 141 outputs a control signal indicating one of the buffer unit 135-1 and the buffer unit 135-2 from which the uplink data signal is input to the L2SW 136 according to the timing according to the calculation result of the timing calculation unit 140. For example, the timing indication unit 141 controls the L2SW 136 so that reading torn the buffer unit 135-2 is performed at the time t1, reading from the buffer unit 135-1 is performed at the time t2, and reading from the buffer unit 135-2 is performed at the time t3. The uplink data signal input by the L2SW 136 is subjected to frame conversion by the uplink frame processing unit 137 and converted into an optical signal by the E/O conversion unit 138, and the optical signal is transmitted to the OLT. The OLT receives the optical signal, converts the optical signal into an electrical signal and outputs an uplink data signal acquired from the electrical signal obtained through the conversion to the host device of the wireless communication system or the host device of the other communication system in accordance with a destination.

Also, when a downlink data signal from the host device of the wireless communication system to the subordinate device 27 of the wireless communication system or from the host device of the other communication system to the subordinate device 37 of the other communication system is received, the OLT performs priority control to convert the downlink data signal into an optical signal and transmits the optical signal to the ONU 130. According to this priority control, the OLT preferentially transmits a downlink data signal addressed to the subordinate device 27 of the wireless communication system to the ONU 130 so that the downlink data signal addressed to the subordinate device 27 of the wireless communication system and a downlink data signal addressed to the subordinate device 37 of the other communication system are not simultaneously transmitted.

The O/E conversion unit 131 of the ONU 130 receives the optical signal transmitted from the OLT, converts the optical signal into an electrical signal, and outputs the electrical signal to the downlink frame processing unit 132. The downlink frame processing unit 132 converts a frame of a downlink signal converted into the electrical signal to separate the frame into a control signal and a downlink data signal. The downlink frame processing unit 132 outputs the downlink data signal to the L2SW 133. The L2SW 133 outputs the downlink data signal addressed to the subordinate device 27 of the wireless communication system to the buffer unit 134-1 and outputs the downlink data signal addressed to the subordinate device 37 of the other communication system to the buffer unit 134-2. The ONU 130 wirelessly transmits the downlink data signal buffered in the buffer unit 134-1 to the subordinate device 27 of the wireless communication system at an allocation time of the downlink of the wireless section of the wireless communication system. Also, the ONU 130 transmits the downlink data signal buffered in the buffer unit 134-2 to the subordinate device 37 of the other communication system at an allocation time of the downlink of the other communication system.

Also, the buffer unit 135-1, the buffer unit 135-2, the L2SW 136, the TDD fame information acquisition unit 139, the timing calculation unit 140, and the timing indication unit 141 can be mounted in a device independent of the ONU. In this case, a similar operation is performed by connecting the ONU to the subordinate device 27 of the wireless communication system and the subordinate device 37 of the other communication system as external adapters.

Also, if the ONU 130 can receive a frame information notification from the subordinate device 27 of the wireless communication system, the TDD frame information acquisition unit 139 may acquire TDD frame pattern information from a frame information notification received from the subordinate device 27 of the wireless communication system without acquiring the TDD frame pattern information from the downlink frame processing unit 132.

Also, the ONU 130 according to the third embodiment and the OLT 110 or 110a according to the first or second embodiment may be used in combination. In this case, the OUT 110 or 110a may receive the TDD frame pattern information acquired from the subordinate device 27 of the wireless communication system by the downlink frame processing unit 132 of the ONU 130 and use the received TDD frame pattern information in the timing calculation unit 119. In this case, the OLT 110 or 110a may not include the TDD frame information acquisition unit 118 and the TDD frame information estimation unit 122.

The optical transmission system uses a WDM mode in which communication is performed simultaneously using different wavelengths in uplink and downlink. Thus, if a TDD type wireless communication system is accommodated in the optical transmission system using the conventional technology, there are many periods for which no data transmission is performed at each wavelength in the optical section, and it cannot be said that system accommodation efficiency is high. In other words, although a host-side optical device and a subordinate-side optical device accommodating a wireless base station of a wireless communication system communicate simultaneously using different wavelengths in an optical transmission system, uplink/downlink is transmitted and received in a single frequency band using a TDD mode in a wireless section in which the wireless base station communicates with a mobile wireless terminal. Consequently, when the communication of the wireless communication system is relayed between the host-side optical device and the subordinate-side optical device of the optical transmission system, uplink transmission and downlink transmission are not performed at the same time and the number of unused periods increases.

The network system according to the above-described embodiment transmits a signal of another communication system such as an FTTH system without using the TDD mode for a TDD non-transmission period in which data of the wireless communication system is not transmitted in the optical section of the optical transmission system. Thus, the optical transmission system mounted in the network system of the present embodiment is provided with a function of determining the TDD non-transmission period of the wireless communication system. Because the radio signal is not transmitted/received in the TDD non-transmission period, an optical path thereof can be regarded as a logically independent optical path. Therefore, this free band is effectively used by relaying the communication of the other communication system. Accordingly, it is possible to accommodate a plurality of services in the same optical transmission system and to reduce the number of devices, thereby making it possible to achieve cost-effectiveness.

Operations to be performed in the optical transmission system, for example, an operation of determining the TDD non-transmission period of the wireless communication system and an operation of relaying communication of the other communication system using a TDD non-transmission section as a logically independent optical path, may be performed by a single device. Also, unidirectional communication of the other communication system may be relayed using only one link of the uplink and the downlink of the optical section of the optical transmission system for the TDD non-transmission period.

Some functions of the OLT 110, the OLT 110a, and the ONU 130 in the above-described embodiment may be implemented by a computer. In this case, the functions may be implemented by recording a program for implementing some functions of the OLT 110, the OLT 110a, and the ONU 130 on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" may include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. Also, the above-described program may be used to implement some of the above-described functions. Further, the program may implement the above-described functions in combination with a program already recorded on the computer system.

Although the embodiments of the present invention have been described above with reference to the drawings, specific configurations are not limited to the embodiments, and a design change and the like may also be included without departing from the scope of the present invention.

INDUSTRIAL APPLICABILITY

The present invention is available if uplink and downlink communication of a TDD mode is relayed and transmitted through signals of different wavelengths.

REFERENCE SIGNS LIST

11 Optical device
12 Optical splitter
13 Optical device
21 Mobile wireless terminal
22 RRH
23 BBU
24 Mobile network
25 Radio control unit
26 Host device of wireless communication system
27 Subordinate device of wireless communication system
31 Communication device
32 Communication device
33 L2SW
36 Host device of other communication system
37 Subordinate device of other communication system
51 Optical fiber
52 Optical fiber
100 Network system
100a Network system
110 OLT
110a OLT
111-1 Buffer unit (relay unit)
111-2 Buffer unit (relay unit)
112 L2SW (relay unit)
113 Downlink frame processing unit (relay unit)
114 E/O conversion unit (relay unit)
115 O/E conversion unit (relay unit)
116 Uplink frame processing unit (relay unit)
117 L2SW (relay unit)
118 TDD frame information acquisition unit (information acquisition unit)
119 Timing calculation unit (calculation unit)
120 liming indication unit (instruction unit)
121 Bandwidth allocation method selection unit (instruction unit)

122 TDD frame information estimation unit (information acquisition unit)
130 ONU
131 O/E conversion unit (relay unit)
132 Downlink frame processing unit (relay unit)
133 L2SW (relay unit)
134-1 Buffer unit (relay unit)
134-2 Buffer unit (relay unit)
135-1 Buffer unit (relay unit)
135-2 Buffer unit (relay unit)
136 L2SW (relay unit)
137 Uplink frame processing unit (relay unit)
138 E/O conversion unit (relay unit)
139 TDD frame information acquisition unit (information acquisition unit)
140 Timing calculation unit (calculation unit)
141 Timing indication unit (instruction unit)

The invention claimed is:

1. A transmission system for relaying communication of communication systems, the transmission system comprising:
   a relay unit configured to relay uplink communication and downlink communication of a communication system that performs a time division duplex (TDD) mode through signals of different wavelengths;
   an information acquisition unit configured to acquire time division information indicating timings of the uplink communication and the downlink communication in the communication system that performs the TDD mode;
   a calculation unit configured to calculate a free period unused in relaying of communication of the communication system that performs the TDD mode on the basis of the time division information for each wavelength; and
   an instruction unit configured to instruct the relay unit to relay communication of another communication system different from the communication system that performs the TDD mode in the free period for each wavelength calculated by the calculation unit.

2. The transmission system according to claim 1, wherein the information acquisition unit monitors the communication of the communication system that performs the TDD mode to be relayed by the relay unit to estimate the time division information.

3. The transmission system according to claim 2, wherein the information acquisition unit estimates the time division information on the basis of traffic of a signal of the communication system that performs the TDD mode or information set in a signal of the communication system that performs the TDD mode.

4. A transmission method to be executed by a transmission system for relaying communication of communication systems, the transmission method comprising:
   a relay step in which a relay unit relays uplink communication and downlink communication of a communication system that performs a TDD mode through signals of different wavelengths;
   an information acquisition step in which an information acquisition unit acquires time division information indicating timings of the uplink communication and the downlink communication in the communication system that performs the TDD mode;
   a calculation step in which a calculation unit calculates a free period unused in relaying of the uplink communication and the downlink communication of the communication system that performs the TDD mode on the basis of the time division information for each wavelength; and
   an instruction step in which an instruction unit instructs the relay unit to relay communication of another communication system different from the communication system that performs the TDD mode in the tree period for each wavelength calculated in the calculation step.

* * * * *